United States Patent [19]
von Ballmoos

[11] Patent Number: 4,703,164
[45] Date of Patent: Oct. 27, 1987

[54] AUTOMATIC CASH-COLLECTING MONITORING INSTALLATION
[75] Inventor: Fritz von Ballmoos, Horgen, Switzerland
[73] Assignee: Dr. von Ballmoos AG, Switzerland
[21] Appl. No.: 843,126
[22] Filed: Mar. 24, 1986
[30] Foreign Application Priority Data
Mar. 22, 1985 [CH] Switzerland ............ 1267/85
[51] Int. Cl.⁴ ............................................. G07B 15/02
[52] U.S. Cl. ..................................... 235/384; 235/489
[58] Field of Search ................................. 235/384, 489
[56] References Cited
U.S. PATENT DOCUMENTS
4,603,390 7/1986 Mehdipour .......................... 235/384

Primary Examiner—Harold I. Pitts
Attorney, Agent, or Firm—Handal & Morofsky

[57] ABSTRACT

The installation contains, in the entrance monitoring apparatus (10 and FIG. 2), a magazine (36) with a stock (37) of parking tokens which have been individually marked before insertion into the magazine. The entrance monitoring apparatus furthermore contains a reader (39) which operates in conjunction with an electric central unit (13) in order to store the marking on each parking token issued and the time of issue of the token. The cash register (12) of the installation contains a reader which, when a parking token is inserted, calls up the relevant time of issue and calculates the parking fee from the time difference. After the fee has been paid, the time of issue in the memory is erased, and the time of payment is stored. The exit monitoring apparatus (11) contains a further reader which calls up the time of payment when the parking token is inserted, and opens the exit barrier (16) if the time span between the time of insertion and the time of payment is within a predetermined tolerance time.

6 Claims, 3 Drawing Figures

AUTOMATIC CASH-COLLECTING MONITORING INSTALLATION

The present invention relates to an automatic cash-collecting monitoring installation for pay parking lots, having at least one entrance monitoring apparatus which issues a parking token and opens an entrance barrier when a vehicle drives up, and having at least one cash register which displays the appropriate parking fee after the parking token has been inserted, and causes an exit barrier to open after the fee displayed has been paid.

There are various types of monitoring installations of the type described above, which differ in structure and in the way in which the parking token is processed.

One of the first installations disclosed is described in, for example, Swiss Pat. No. 527,473. In this installation, all apparatuses, i.e. the apparatus for monitoring the entrance, the cash register and the apparatus for monitoring the exit, are connected to a central clock, and the parking token, intended to be used only once, bears time information which is required for calculating the parking fee or for determining the tolerance time for driving out. In this installation, the entrance monitoring apparatus contains a first punch which, when a vehicle drives up, calls up time information from the central clock and punches this information in machine-readable form into the entrance token before issuing the token. The cash register contains a first reader which reads the time information on an inserted parking token, compares this information with the valid time information from the central clock and calculates the parking fee from the parking time determined in this manner. The cash register furthermore contains a second punch which, after the parking fee has been paid, punches the valid time information into an exit token. Finally, the exit monitoring apparatus contains a second reader which reads the time information on an inserted parking token or exit token and compares this information with the current value of the time information from the central clock and, if the difference is within a predetermined value, opens the exit barrier.

Because punches are very expensive in relation to the other parts of a monitoring installation and have to be serviced regularly, a further development of the installation described has also been proposed. In this further development of the installation, bearing the project name "Rotacard", a punch was provided only in the entrance monitoring apparatus, and in addition a central, electric memory was provided in which the issuing time of each parking token possessing an individual piece of punched information was stored. To calculate the parking fee, this issuing time was called up by the automatic cash register from the memory and, after payment had been made, was replaced by a signal which, when the parking token was inserted into the exit monitoring apparatus, indicated that the parking fee had been paid.

The second known installation is described in, for example, German Offenlegungsschrift No. 33 07 926.2, and is available under the name "Rotamat". In this installation, all apparatuses are connected to an electronic central unit, and the parking token, which is intended for repeated use, bears the address of a memory location in the memory of this central unit, in which memory location all data required for calculating the parking fee and for opening the exit barrier are stored. In the embodiment described in the stated Offenlegungsschrift, the entrance monitoring apparatus contains a magazine of "parking tokens", which are preferably in the form of circular or rectangular jettons and consist of, for example, plastic or metal. Each jetton is provided with an individual code, preferably in the form of a bar code. When a vehicle drives up, a jetton is fed from the magazine into a reader and the code read is passed to the central unit, which stores time information in the memory location assigned to the code; the jetton is then issued as a "parking token". When a jetton is inserted into the cash register, the code of the jetton is again read, and the time information required for calculating the parking fee is called up from the associated memory location. After the parking fee has been paid, the same jetton is returned, and a further piece of time information is stored in the associated memory location. When the jetton is inserted into the exit monitoring apparatus, the code of the jetton is again read and the last time information in the associated memory location is compared with the current time information, and, if the difference is within a predetermined tolerance time, the exit barrier is opened and the contents of the memory location are erased.

Both installations have proven satisfactory when used in practice. However, the relatively high production costs are a disadvantage. In the first type of installation, these costs are due in particular to the punches and the associated transport means for the parking token, as well as to the readers, each of which in a conventional embodiment possesses 108 reading elements when the parking token contains not only the time information but also information by means of which, for example, the installation itself, the parking token category, etc. are defined. In the second type of installation, the costs are governed to a large extent by the jetton magazine in the entrance monitoring apparatus, the issuing means associated with this magazine, the readers for the bar code and the transport means associated with each reader. As anyone skilled in the art knows, unambiguous reading of a bar code is dependent on a constant speed of transport of the code-bearing object through the reader and on reliable recognition of the individual bars; for this purpose, the installations described here require an optical projection system with great depth of focus, because experience has shown that, after repeated use, the reusable jettons not only become scratched on the surface but frequently also become bent in several directions.

It is therefore the object of the present invention to provide an automatic cash-collecting monitoring installation which has the same operational reliability as the known installations but can be produced at a substantially lower price.

This object is achieved, according to the invention, by an installation of the type defined at the outset, wherein the entrance monitoring apparatus contains a magazine for a large number of parking tokens, each of which has at least one machine-readable, individual code, and a means for issuing individual parking tokens and for reading the code, and wherein an electronic central unit is provided whose memory is intended for storing the code of each parking token issued and of an associated clock, and which, when a parking token is inserted into the cash register, supplies the data required for calculating the parking fee.

The installation according to the invention does not contain a punch in any of its apparatuses, requires a means for individually issuing the parking tokens only in the entrance monitoring apparatus, and is of simple design and in particular has fewer mechanically moved parts than the installations known to date and is therefore not only substantially cheaper than these but also less liable to break down and hence simpler to maintain and to service.

An illustrative example of the monitoring installation according to the invention and a preferred embodiment of the code for the parking token are described below with the aid of the figures.

Figure 1:
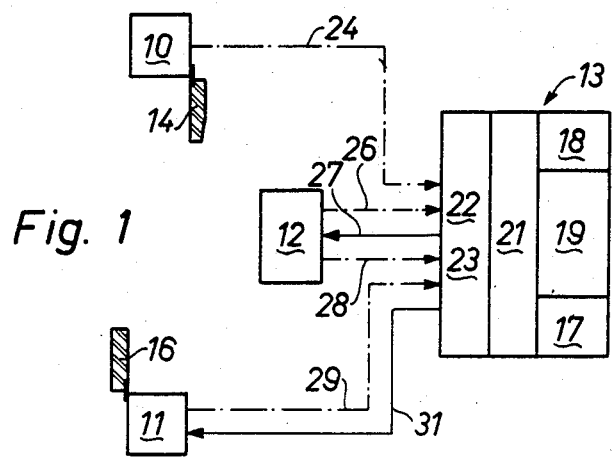
FIG. 1 shows a block diagram of a simple monitoring installation.

The simple monitoring installation shown schematically in FIG. 1 corresponds to an embodiment available under the identifying name "Monocard". This installation contains an entrance apparatus and an exit apparatus, 10 and 11, respectively, a cash register 12 and an electronic central unit 13. A barrier 14 or 16, respectively, is assigned to each entrance and exit apparatus in a conventional manner. The central unit contains a control unit 17, a clock 18, a memory 19, a processor 21 and at least one input control 22 and one output control 23. The entrance apparatus 10 is connected to the input control 22 via a data line 24, and the cash register 12 is connected to the output control via a data line and an information line, 26 and 27 respectively, and to the input control via a further data line 28. The exit monitoring apparatus is connected to the output control of the central unit 13 via a data line and an iniormation line, 29 and 31 respectively. Electronic central units and appropriate peripheral equipment are familiar to anyone skilled in the art, and their structure and connection will therefore not be described in detail here.

Figure 2:
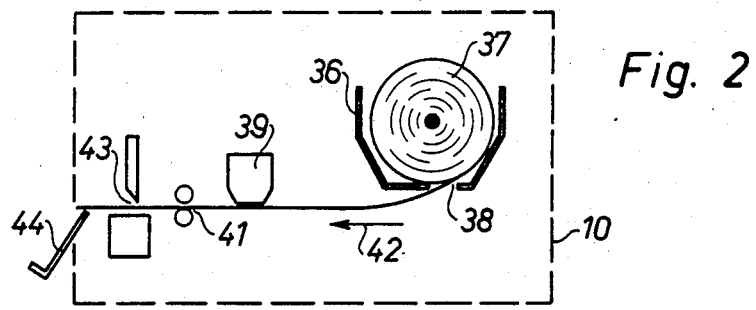
FIG. 2 shows a schematic representation of an entrance monitoring apparatus.

FIG. 2 shows, once again schematically, the most important parts of an entrance monitoring apparatus. This apparatus contains a beaker-shaped magazine 36, into which a rolled-up tape 37 is inserted. The tape preferably consists of stiff paper or thin cardboard and has a large number of machine-readable, individual codes which, in a simple form, represent multidigit ordinal numbers. The codes are applied to the entire length of the tape, at uniform intervals. The free end of the tape is fed through an opening 38 in the bottom of the magazine and past a reader 39 to a transport means 41. The reader contains 8 reading elements which are arranged in a row, transversely with respect to the tape transport direction indicated by the arrow 42. In a simple form, the transport means consists of two rollers which are pressed together by means of springs and feed the tape by frictional contact. A separating means 43 is arranged behind the rollers of the transport means, the said separating means in a simple form consisting of a table over which the tape is moved, and a blade which can be moved to and fro at right angles to the surface of the table. Furthermore, adjacent to the table of the separating means, an issuing surface 44 is fastened which catches each section separated from the tape and from which the section can be removed.

Figure 3:
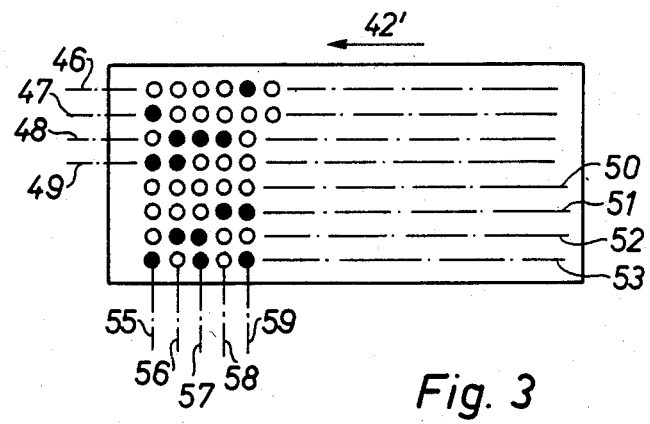
FIG. 3 shows a parking token having a preferred embodiment of the code.

The example shown in FIG. 3, for coding a parking token, contains 40 code elements which are arranged in eight columns, 46 to 53, in the transport direction 42', and in five rows, 55 to 59, running transverse to the transport direction. When the BCD code possessing only four code elements is used, this arrangement makes it possible to represent two digits in each row, one digit in the columns 46 to 49 and the other in the columns 50 to 53. One digit in each row forms a larger number, and the other digit indicates the position of the adjacent digit in the larger number. In the example shown, the coding of the rows in columns 46 to 49 (read from left to right) corresponds to the digits 5, 3, 2, 2, 8 and the associated positions specified in the columns 50 to 53 are 1, 2, 3, 4, 5, which gives the number 82235.

The representation described, comprising coded digits together with the associated positions, permits reliable machine reading of a multidigit number, regardless of the sequence in which the individual digits are read and regardless of the speed of passage through the reader. This has the practical advantage that there is no need to assign a transport means to the reader, and that the code is read without errors even when the code-bearing object is inserted manually into the reader, and, for example, the same row is fed repeatedly past the reading elements as a result of uncontrolled movements.

In describing the mode of operation of the installation according to the invention, it is assumed that a vehicle drives up to the barrier 14 of the entrance monitoring apparatus 10. Then, in an installation ready for operation, the transport means 41 is activated by an induction loop embedded in the floor or by actuation of a press-button switch. The transport means then pulls the tape 37 bearing a coded number past the reader 39 which reads the code on the tape and transmits it via the data line 24 to the central unit 13. The part of the tape possessing the read number is pushed further into the separating means 43, where it is separated from the tape and falls onto the issuing surface 44, from which it can be removed manually as a parking token. At the same time, the mechanism for opening the barrier 14 is also activated.

The control unit 17 of the central unit then uses the supplied number as an address for a memory location in the memory 19, in which the current time from the clock 18 is stored. This time can correspond to the valid date and the true time. However, it is also possible to use times which correspond to a sequence of time intervals which are selected to match the scale of fees to be used.

If the parking lots monitored by the installation are full, or the driver decides not to park his vehicle, he can drive directly to the exit monitoring apparatus 11. He must then insert his parking token into the reading slot of the monitoring apparatus. The reading slot is in the form of a pocket whose depth is smaller than the lehgth of the parking token. In this way, the parking token inserted into the reading slot projects sufficiently from its opening and can be removed from the reading slot without difficulties. The reading slot is assigned a reader which, as described above, reads the digits of the coded number and the position of each digit and transmits these via the data line 29 to the central unit. The control unit 17 then causes the processor 21 to compare the current time of the clock 18 with the contents of the memory location bearing the address corresponding to the coded number. If the difference between the two times is smaller than a predetermined tolerance value, the exit monitoring apparatus is informed appropriately via an information line 31, and opens the exit barrier 16. If the difference is greater than the tolerance value, the exit monitoring apparatus receives information which generates an optical signal which refers the driver to the cash register.

The cash register 12 likewise contains a reading slot which has a form similar to the reading slot in the exit monitoring apparatus. When a parking token is inserted into this slot, the digits read and the position assigned to each digit are transmitted via the data line 26 to the central unit. The control unit 17 then causes the processor 21 to compare the contents of the memory location bearing the address corresponding to the read number with the current time of the clock 18, and to calculate a parking fee corresponding to the difference. The magnitude of this parking fee is then transmitted via the information line 27 to the cash register, which displays the amount optically. As soon as this amount is inserted into the cash register, the latter generates an appropriate signal, which is transmitted via the data line 28 to the central unit. The control unit then causes the previous time in the addressed memory location to be erased and the current time to be read in. If the parking token is subsequently inserted into the reading slot of the exit monitoring apparatus, the processor of the central unit compares the time when the parking fee was paid with the current time, and opens the exit barrier if the difference between these two times is smaller than the predetermined tolerance value.

Of course, the installation described can be modified in a variety of ways and adapted to specific structural and operating conditions. For example, instead of the one entrance monitoring apparatus and one exit monitoring apparatus described, the installation may also possess a plurality of entrance monitoring apparatuses and a plurality of exit monitoring apparatuses and also be equipped with a plurality of cash registers. It is also possible to install the cash register in the same housing as the exit monitoring apparatus. Instead of the readers described, which are present in the exit monitoring apparatus and in the cash register and to which no transport means are assigned, it is of course also possible to use readers with transport means, although this makes the installation more expensive and means dispensing with one of the advantages made possible by the invention. Furthermore, it is possible for some or all of the modules forming the central unit to be transferred to the entrance monitoring apparatus and/or exit monitoring apparatus or to the cash register. This applies in particular to that part of the processor which is intended for calculating the parking fee, which can be carried out directly in the cash register, and to the comparison of the times, which can be carried out in the exit monitoring apparatus. It is also possible to use a memory in whose memory locations the individual code of the parking token and the current time are stored in a predetermined sequence, and, when searching for a particular stored time, to compare the codes stored in the memory locations with the relevant code. Finally, in the entrance monitoring apparatus, the transport means for the tape, from which the parking tokens are separated, may possess a toothed roller instead of the two frictional rollers described, in which case the tape bearing the coded numbers must possess a perforated channel whose holes are engaged by the teeth of the toothed roller.

I claim:

1. An automatic cash-collecting monitoring installation for pay parking lots, having at least one entrance monitoring apparatus (10) which issues a parking token and opens an entrance barrier (14) when a vehicle drives up, and having at least one cash register (12) which displays the parking fee after the parking token has been inserted, and causes an exit barrier (16) to open after the fee displayed has been paid, wherein the entrance monitoring apparatus (10) contains a magazine (36) for a large number of parking tokens (37), each of which has a machine-readable individual code (FIG. 3), and a means (41) for issuing individual parking tokens and for reading (39) the code, and an electronic central unit (13) whose memory (19) stores the data associated with the issuing of each parking token and which, when the parking token is inserted into the cash register (12), supplies the data required for calculating the parking fee.

2. An installation as claimed in claim 1, wherein at least one exit monitoring apparatus (11) physically separated from the cash register (12) is provided, and, when a parking token is inserted, the said monitoring apparatus requests that memory location in the memory (19) of the central unit (13) which is assigned to the code of the parking token and opens the exit barrier (16) if the stored entry time, or the time which has elapsed since payment of the parking fee, is within a predetermined tolerance time interval.

3. An installation as claimed in claim 1, wherein, in the entrance monitoring apparatus (10), the means for issuing individual parking tokens contains a transport means and a separating means (41 and 43 respectively), and the large number of parking tokens are inserted in the form of a rolled-up tape (37) into the magazine (36), which tape has the machine-readable codes at predetermined intervals, and which transport means (41), in order to issue a parking token, unrolls the free end of the tape (37) by a length which corresponds to the distance between adjacent codes and feeds it into a reader (39) which reads the code and transmits it to the electronic central unit (13), and which separating means (43) separates off the read part of the tape, which is then issued as a parking token.

4. An installation as claimed in claim 1, wherein the machine-readable code is divided into eight parallel columns (46 to 53) arranged along the longitudinal direction of the parking token, of which four adjacent code fields (46 to 49), in at least one row (55, 56, 57, 58, 59), denote a digit, and the other four adjacent code fields (50 to 53) of the same row (55, 56, 57, 58, 59) denote a decimal place assigned to the digit, and each reader (39) in the entrance monitoring apparatus and in the exit monitoring apparatus (10 and 11 respectively) and in the cash register (12) possesses only eight reading elements arranged in a row transversely with respect to the input or output direction of the parking token.

5. An installation as claimed in claim 1, wherein at least one part of the code is a multidigit number which is used as an address for a memory location in which a first time signal is stored when the parking token is issued, which first time signal is erased and replaced by a second time signal when the parking fee is paid, and which second time signal is erased when the exit barrier (10) is opened.

6. An installation as claimed in claim 1, wherein, when the parking tokens are issued, the memory locations in the memory (19) are occupied consecutively by storage of the parking token code and a first time signal, and, when the parking fee is paid, only the first time signal is erased and replaced by the second time signal, and the second time signal and the parking token code are erased only when the exit barrier (16) is opened.

* * * * *